United States Patent

Mair et al.

[11] 4,186,476
[45] Feb. 5, 1980

[54] METHOD FOR PRECISE FITTING OF MOTOR VEHICLE FRONT END SHEET METAL

[75] Inventors: Alex C. Mair; Stephen A. Mair, both of Bloomfield Hills, Mich.

[73] Assignee: General Motors Corporation, Detroit, Mich.

[21] Appl. No.: 942,052

[22] Filed: Sep. 13, 1978

[51] Int. Cl.² ............ B23P 11/00; B23Q 3/00; B62D 25/10
[52] U.S. Cl. .................................. 29/407; 29/428; 29/464; 180/69 C
[58] Field of Search ............ 29/407, 428, 434, 445, 29/464, 467; 180/69 C

[56] References Cited

U.S. PATENT DOCUMENTS

| | | | |
|---|---|---|---|
| 2,826,256 | 3/1958 | Haltenberger | 180/69 C |
| 3,059,328 | 10/1962 | Krause | 29/407 X |
| 3,225,857 | 12/1965 | De Haan et al. | 180/69 C |
| 3,382,620 | 5/1968 | Cloutier | 29/407 X |
| 3,893,207 | 7/1975 | Rudaitus et al. | 180/69 C |

*Primary Examiner*—Ervin M. Combs
*Attorney, Agent, or Firm*—Charles E. Leahy

[57] ABSTRACT

The invention provides a method by which the hood of a motor vehicle is precisely aligned and centered relative the fenders and the header without alternating trial-and-error steps of inspection and adjustment. The hood is prepared for assembly by attaching the hood hinges at a precise longitudinal location and attaching the latch striker at a position having a precise vertical distance from the appearance surface of the hood and precisely centered transversely between the edges of the hood. Pads attached to the hood at the forward corners are milled to a precise vertical distance from the appearance surface of the hood. The body is prepared to receive the hood by attaching the latch assembly to the header at a precisely centered transverse location and at a precise vertical distance from the appearance surfaces of the fenders and header. The adjusting screws for engaging the hood pads are adjusted to a precise vertical height relative the appearance surfaces of the fenders and header. A first gage hole is provided in the fender link of the hood hinge at a precise location relative the appearance surfaces of the hood and a mating second gage hole is provided on the fender at a precise location relative the appearance surfaces of the fender so that attachment of the hood to the body via the hood hinges precisely aligns and centers the hood.

3 Claims, 11 Drawing Figures

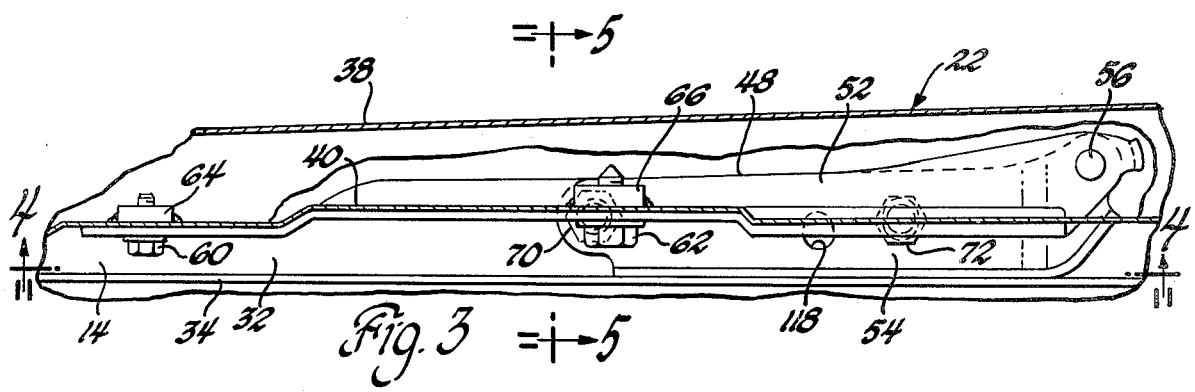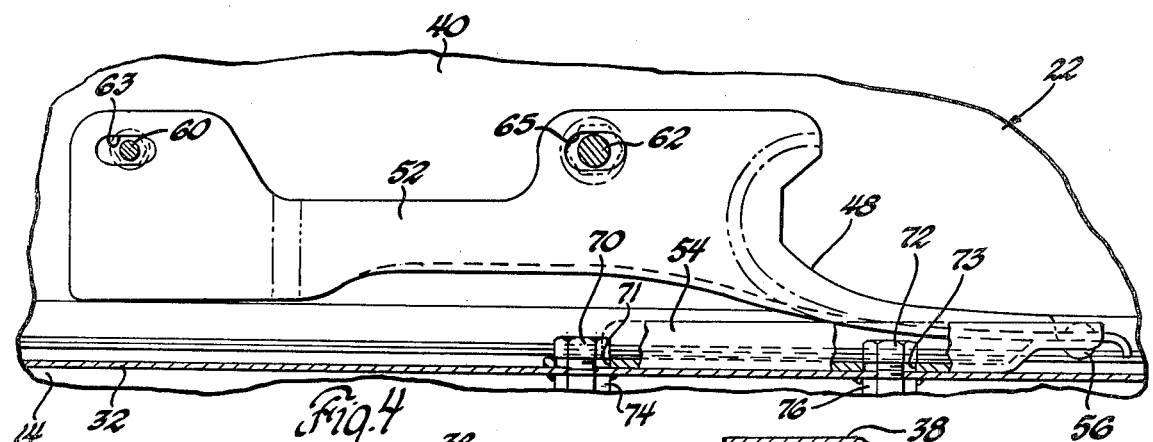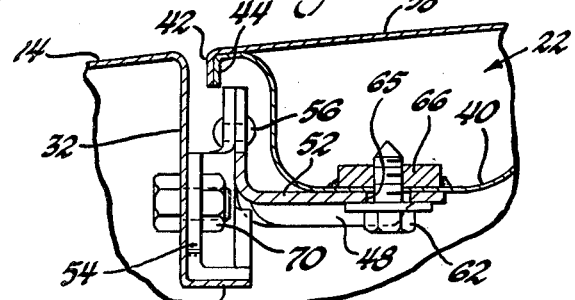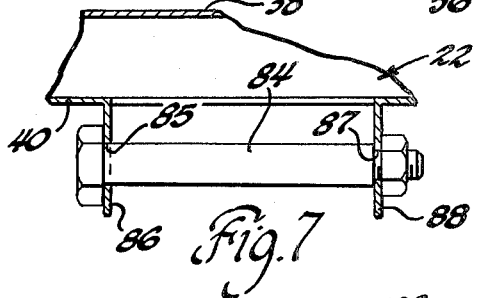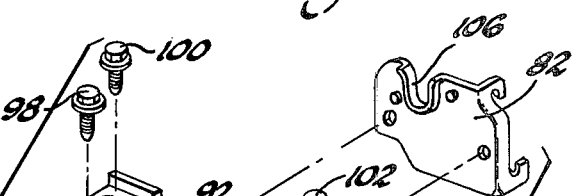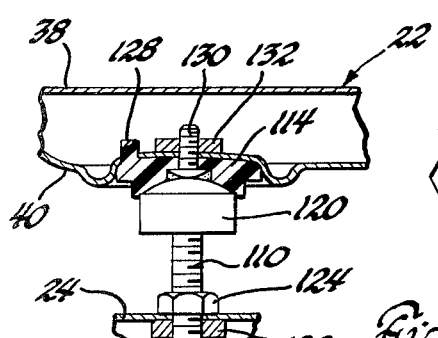

METHOD FOR PRECISE FITTING OF MOTOR VEHICLE FRONT END SHEET METAL

The invention relates to a method by which the front end sheet metal parts of a motor vehicle body are precisely aligned and centered relative one another.

BACKGROUND OF THE INVENTION

Conventional motor vehicles have a front end assembly comprised of a pair of laterally spaced fenders having their forward ends connected by a transversely extending header assembly including a radiator support and a header panel. The fenders and the header panel define an engine compartment opening which is selectively opened and closed by a hood mounted on the fenders by a pair of hinges having a hood link attached to the hood and a fender link attached to the fender. A striker is mounted at the forward end of the hood and cooperates with a latch mounted on the header assembly to latch the hood in the closed position. Adjustable screws are conventionally mounted on the header assembly adjacent the corners of the hood to engage and support the forward undersurface of the hood.

It is well known in the aforedescribed front end structure to make the connection between the various component parts by the use of bolts which extend through elongated holes so that the parts can be adjusted relative one another by loosening and then tightening the bolts. It is also well known to employ assembly fixtures during assembly of the fenders and header assembly to the body to position the parts relative one another prior to the tightening of the bolts to the specified torque so that the front end structure provides a square hood opening and a uniform gap between the rear edges of the fenders and the forward edges of the vehicle doors.

It is also desirable for the adjacent appearance surfaces to be aligned in the vertical direction as well as to achieve a uniform spacing of the hood from the fenders and header assembly. The hood hinges are conventionally provided with slotted holes so that the vertical, transverse, and longitudinal location of the hood can be adjusted relative the fenders and header assembly to precisely align the outer appearance surfaces of the hood relative the fenders and header assembly and to center the hood within the hood opening. This alignment and centering of the hood is obtained through alternating steps of adjustment and inspection. More specifically, it is common practice for the assembly worker to employ his skill and experience in estimating an initial attachment of the hood hinges to the hood and the fender and the appropriate adjustment of the adjusting screws. The hood is then closed to observe any disparity in the alignment and centering of the hood relative the fenders and the header panel. The hood hinge bolts are then loosened or the adjusting screws are adjusted to bring the hood to a better fit with the fenders and header assembly. This procedure of alternating inspection and adjustment is repeated until an acceptable hood fit is obtained.

The assembly worker's attempt at precise alignment of the hood in a minimum of trial fittings is frustrated by the variation in the size, alignment, centering, and conformance to shape which result from the application of conventional manufacturing and assembly techniques. For example, it is known that stamped steel parts will vary somewhat in dimension and shape because of spring-back of the pressed steel. Furthermore, the welded assembly of two sheet steel parts, for example, the inner and outer hood panels, can result in a variation in the dimensions of the finished parts.

BRIEF SUMMARY OF THE INVENTION

The feature, object, and advantage of the present invention resides in the provision of an assembly method by which front end sheet metal parts may be gaged and assembled for precise alignment and centering relative one another during their final assembly.

Another feature, object, and advantage of the invention resides in the provision of a method for the assembly of vehicle front end sheet metal to provide consistent precise alignment and centering of the front end component parts irrespective of variation in dimension and shape of the component parts and without resort to trial-and-error alternating steps of adjustment and inspection.

According to the invention a method of precisely aligning the outer appearance surfaces of the hood relative the adjacent appearance surfaces of the fenders and the header assembly comprises the steps of: attaching the striker to the hood at a precise transverse and vertical position relative the outer appearance surfaces of the hood; machining the undersurface of the hood engaged by the adjustable screws to a precise vertical height relative the outer appearance surface of the hood; attaching the hood latch to the header assembly at a precise vertical and transverse location relative the outer appearance surfaces of the fenders and header; adjusting the adjustable screws to a precise vertical height relative the outer appearance surfaces of the fenders and header and attaching the hinge hood link and the hinge fender link to the hood and fenders respectively at locations establishing a precise longitudinal location of the hood relative the fenders and header.

Accordingly, the hood hinges establish the hood at a longitudinal location precisely spaced from the header assembly, transversely center the rearward end of the hood between the fenders, and align the vertical height of the rearward end of the hood with the outer appearance surfaces of the fenders. The machined undersurface of the hood engages the adjustable screws to establish a precise vertical height of the forward end of the hood in alignment with the outer appearance surfaces of the fenders. The engagement of the striker in the hood latch centers the forward end of the hood between the fenders and assists the adjusting screws in establishing the vertical height.

More specifically, in those instances where the hood hinges are of the single pivot type having a pivot connecting a hood link and the fender link, the hinge is attached to the hood and then a gage hole is drilled in the fender hinge link at a precise longitudinal and vertical location relative the appearance surfaces of the hood. Another gage hole is provided in the fender at a precise longitudinal location and at a predetermined vertical height relative the appearance surface of the fender so that alignment of the gage holes of the fender hinge link and the fender align and center the hood relative the appearance surfaces of the header and fenders upon bolting of the fender hinge link to the fender.

Other hood hinges are of the parallelogram or alligator type which permit limited vertical and transverse movement of the hood relative the fenders when the hood is closed. The invention provides for grinding the downturned flanges of the hood to form a cam surface having a precise vertical height relative the outer appearance surface of the hood. A mating cam surface is machined on the vehicle body adjacent the rearward undersurface of the hood at a precise transverse location corresponding to the transverse spacing of the hood flanges and at a precise vertical height relative the appearance surfaces of the fenders. The cam surfaces of the hood and the vehicle body coact with one another to vertically align the appearance surfaces of the hood with the adjacent appearance surfaces of the fenders and to center the rearward end of the hood between the fenders.

BRIEF SUMMARY OF THE DRAWINGS

These and other objects, features, and advantages of the invention become apparent upon consideration of the specification and the appended drawings in which:

FIG. 3 is a view taken in the direction of arrows 3—3 of FIG. 2;

FIG. 4 is a view taken in the direction of arrows 4—4 of FIG. 3;

FIG. 5 is a sectional view taken in the direction of arrows 5—5 of FIG. 3;

FIG. 6 is a sectional view taken in the direction of arrows 6—6 of FIG. 2;

FIG. 7 is a sectional view taken in the direction of arrows 7—7 of FIG. 2;

FIG. 8 is an exploded view of the hood latch;

DESCRIPTION OF THE PREFERRED EMBODIMENT

Figure 1:
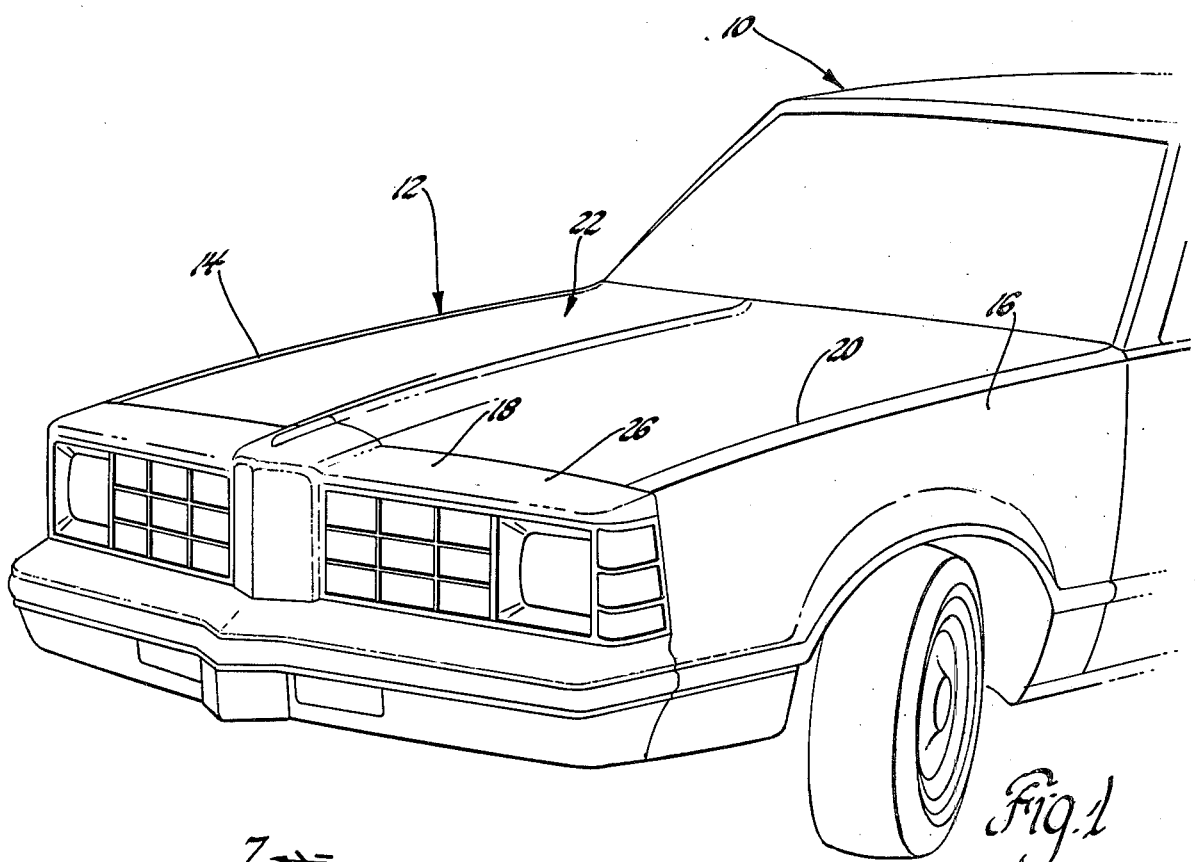
FIG. 1 is a perspective view of a motor vehicle front end sheet metal assembly.

Referring to FIG. 1, it is seen that a vehicle body generally indicated at 10 has a front end sheet assembly generally indicated at 12 which includes a right-hand fender 14, a left-hand fender 16, and a header assembly 18 cooperating to define an engine compartment opening 20 which is selectively opened and closed by a hood 22.

Figure 2:
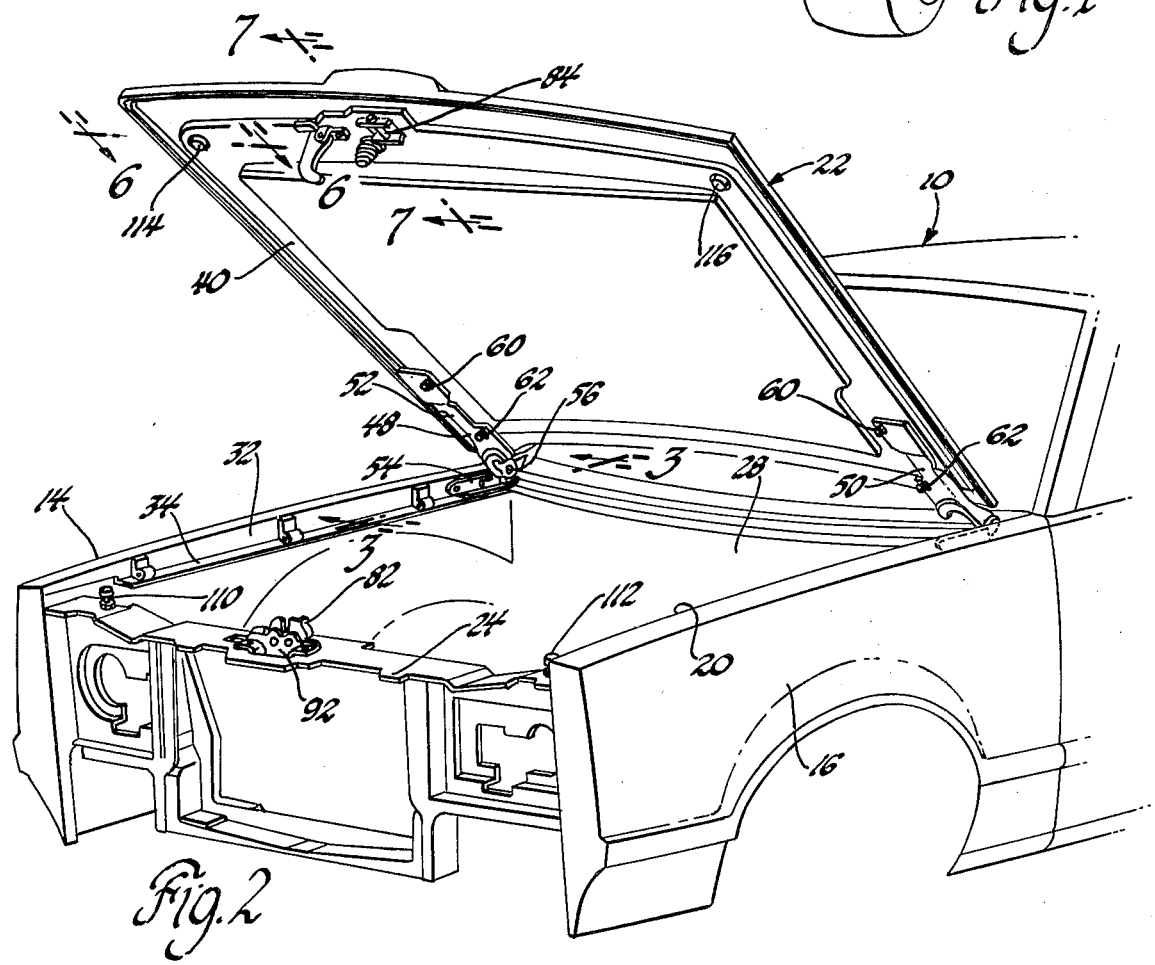
FIG. 2 is similar to FIG. 1 but showing parts broken away and in section and the hood in the open position.

Referring to FIG. 2, it is seen that the header assembly 18 includes a radiator support 24 which extends transversely between the forward ends of the fenders 14 and 16 to provide structural rigidity to the front end assembly. The header assembly 18 also includes a header panel 26 which conceals the radiator support 24 and may be a sheet metal stamping or molded plastic.

The forward and rearward ends of the fenders 14 and 16 are respectively attached to the cowl structure 28 of the vehicle body and the radiator support 24 by bolts extending through slotted holes so that the parts may be adjusted relative one another to square the hood opening 20 and provide visually consistent gaps between the doors and fenders. The attainment of such a properly aligned and squared assembly is facilitated by the use of an assembly fixture which is located by gage holes provided in the cowl 28 and has locating surfaces for positioning the fenders and the radiator support while making the bolted attachment therebetween. The header panel 26 is similarly attached to the radiator support 24 and/or the fenders by bolts and slotted holes and is positioned by the assembly fixture.

The fenders 14 and 16 and the header panel 26 have sculptured outer appearance surfaces which mate and align with one another to define the outer appearance surfaces of the front end assembly.

The fender 14 has a downturned flange 32 integral therewith which defines a visually observable edge of hood opening 20. A lateral flange 34 extends from the downturned flange 32 and is conventionally provided by a reinforcing panel which is welded to the fender 14. Reference to the fender hereinafter is intended to refer to the fender as well as its component parts welded or otherwise fixed thereto. The fender 16 is constructed similar to the fender 14.

Referring to FIGS. 2, 5, 6 and 7, it is seen that the hood 22 is comprised of an outer panel 38 and an inner panel 40 which are welded together at their respective downturned flange portions 42 and 44. As best seen in FIG. 5, the downturned hood flange 42 defines a visually observable edge which is spaced from the downturned fender flange 32 to define a visually observable gap. A similar downturned flange is provided at the forward end of the hood 22 and cooperates with the edge of header panel 26 to define a gap therebetween.

Referring again to FIG. 2, it is seen that the rearward end of hood 22 is connected to the fenders 14 and 16 by hood hinges 48 and 50. The hood hinge 48 includes a hood link 52 bolted to the hood 22, a fender link 54 bolted to the fender 14, and a pivot pin 56 connecting the hood link 52 and fender link 54.

Referring to FIGS. 3, 4, and 5, it is seen that the hood link 52 is attached to the hood inner panel 40 by bolts 60 and 62 which extend through longitudinally slotted holes 63 and 65 of the hood link 52 and threadedly engaged in nuts 64 and 66 welded within the hood 22. The slotted holes 63 and 65 permit longitudinal adjustment of the hood link 52 relative the hood 22 and are also oversize in the transverse direction to permit transverse adjustment of the hood link 52 relative the hood 22.

The fender link 54 of hood hinge 48 is attached to the fender flange 32 by bolts 70 and 72 which extend through oversized holes 71 and 73 in the fender link 54 and are threadedly engaged in nuts 74 and 76 welded to fender flange 32. The oversized holes permit vertical and longitudinal adjustment of the fender link 54 relative the fender 14.

Referring to FIGS. 2, 7, and 8, it is seen that the hood 22 is latched in the closed position by a latch mechanism including a latch assembly 82 mounted on the radiator support 24 and a striker pin 84 attached to the hood 22. Referring to FIG. 7, it is seen that the striker pin 84 is a bolt which extends through apertures 85 and 87 of downturned tabs 86 and 88 of the hood inner panel 40. The latch assembly 82 is attached to a mounting bracket 92 by a pair of bolts 94 and 96 extending through vertically elongated holes which permit vertical adjustment of the latch assembly 82. The bracket 92 is attached to the radiator support 24 by bolts 98, 100 and 102 which extend through transversely elongated bolt holes in the bracket 92 to permit adjustment of the latch assembly 82 transversely of the motor vehicle. The latch assembly 82 includes an upwardly opening recess 106 having sidewalls which closely capture the striker pin and limit its downward movement. The latch assembly has an associated latch bolt, not shown, which engages the striker pin 84. The latch mechanism is effective to define the vertical position of the forward end of hood 22 in the closed position and also center the hood 22 transversely with respect to the hood opening 20.

Referring to FIGS. 2 and 6, it is seen that adjusting screws 110 and 112 are mounted on the radiator support 24 adjacent the forward corners of the hood 22 for engagement with pads 114 and 116 mounted on the hood. Referring to FIG. 6, it is seen that adjusting screw 110 has an elastomeric cushion 120 attached to the head thereof and is adjustably screwed into a weld nut 122 attached to the radiator support 24. A jam nut 124 fixes the height of the adjusting screw 110. The pad 114 is of molded plastic and has an antirotation tab 128 which extends through an aperture of the hood inner panel 40. A screw 130 extends through a central aperture of the pad 114 and receives a nut 132 to attach the pad 114 to the hood inner panel 40.

The present invention provides a method by which the hood may be adjusted relative the fenders and header panel to precisely align and center the appearance surfaces of the hood with the appearance surfaces of the fender and header panel.

According to the invention, the hood 22 is placed upside down in a hood fixture off the assembly line which supports the hood in the vertical direction by engagement with the appearance surface of the hood outer panel generally adjacent the striker pin 84, the pads 114 and 116, and in the transverse and longitudinal directions by engagement with the downturned flange 42 at the forward end and side edges of the hood 22.

A drilling machine is associated with the hood fixture for drilling the striker pin mounting apertures 85 and 87. The drill machine drills the apertures 85 and 87 at a transverse position precisely centered between the downturned flanges 42 at the side edges of the hood 22 so that the striker pin 84 will be located exactly at the transverse center of the hood 22. Furthermore, the drilling machine locates the apertures 85 and 87 at a precise vertical distance from the outer appearance surface of hood outer panel 38. The hood fixture also has an associated milling machine which mills the pads 114 and 116 to a precise vertical height from the outer appearance surface of the hood outer panel 38.

The hood fixture also has a hinge positioning fixture which positions the hood hinges 48 and 50 on the hood 22 at a precise longitudinal position relative the downturned flange 42 at the forward end of the hood 22 and at transverse locations and spacings which will center the hood 22 within the hood opening 20 upon subsequent assembly. The bolts 60 and 62 are tightened to attach the hood link 52 to the hood 22 at the position determined by the hinge positioning fixture. The fender link 54 is then clamped in the hinge closed position and a gage hole 118 is drilled by another drilling machine associated with the hood fixture at a position to locate the gage hole 118 at a precise vertical distance from the outer appearance surface of the hood 22 and at a precise longitudinal position relative the downturned flange 42 at the forward end of the hood 22.

A milling machine is also associated with the hood fixture and mills the surface of the pads 114 and 116 to a precise vertical distance from the outer apperance surface of the hood outer panel 38.

The above described operations performed on the hood while cradled upside down in the hood fixture prepare the hood for its subsequent assembly to the front end structure by presetting the striker pin 84, pads 114 and 116, and the hood hinges 48 and 50 in a manner which qualifies the hood for subsequent assembly without adjustment.

The fenders 14 and 16, the radiator support 24, and header panel 26 are readied to receive the hood by a body fixture which rests upon the outer appearance surfaces of the fender and the downturned flange 32 thereof. The body fixture has a pair of air motors associated therewith adapted to rotate the adjusting screws 110 and 112 to a precise vertical elevation relative the outer appearance surfaces of the fenders 14 and 16 adjacent thereto so that engagement by the hood pads 114 and 116 will establish the adjacent outer appearance surfaces of the hood and fenders in vertical alignment with one another. This body fixture may also have a locating detail thereon which will establish the longitudinal position of the header panel 26. The body fixture also has a pair of drilling machines associated therewith for drilling gage holes into the downturned fender flange 32 of fenders 14 and 16 at a precise longitudinal position relative the header panel 26 and at a vertical elevation relative the outer appearance surface of the fender so that alignment of the gage hole of the hood hinge fender link 54 therewith will establish the rear corners of the hood in vertical alignment with the adjacent appearance surfaces of the fenders upon bolting of the hood link 52 to the fenders.

The body fixture also has a locating detail such as an air cylinder actuatable to locate the latch assembly 82 at a precise transverse centered position and at a vertical elevation which, upon receipt of the striker pin 84, will center the forward end of the hood 22 in the transverse direction and capture the striker pin 84 to assist in establishing the hood in vertical alignment with the adjacent appearance surfaces of the header panel 26.

Upon assembly of the hood 22 to the fenders, a gage pin is utilized to align the gage hole 118 of the fender link 54 with the gage hole of the fender flange 32 to position the hood during tightening of the bolts 70 and 72. The gage pin establishes the vertical elevation of the hood hinge and the longitudinal location of the hood hinge to vertically align the rear corners of the hood with the adjacent outer appearance surfaces of the fenders without trial-and-error fitting. Alignment of the gage holes also serves to establish the longitudinal location of the hood 22 to provide a uniform gap between the forward edge of the hood and the header panel 26. Upon closure of the hood 22 the elevation of the forward corners of the hood will be precisely established in vertical alignment with the adjacent appearance surfaces of the fenders 14 and 16 and header panel 26 by virtue of the presetting of the heights of the adjusting screws 110 and 112 and their respectively engaged hood pads 114 and 116. Furthermore, the striker pin 84 is captured within the upwardly opening recess 106 of latch assembly 82 to center the forward end of the hood transversely of the vehicle so that the gap between the side edges of the hood and the downturned flanges 32 of the fenders is uniform.

It will be understood in the foregoing embodiment of the invention that the hinge gage holes drilled in the downturned fender flange 32 by the fixture may alternatively be formed in the fenders prior to their assembly to the body by gaging in the vertical direction from the outer appearance of the fender and in the longitudinal direction from either the rearward end of the fender adjacent the door or from the nose of the fender.

DESCRIPTION OF A SECOND EMBODIMENT

Figure 9:
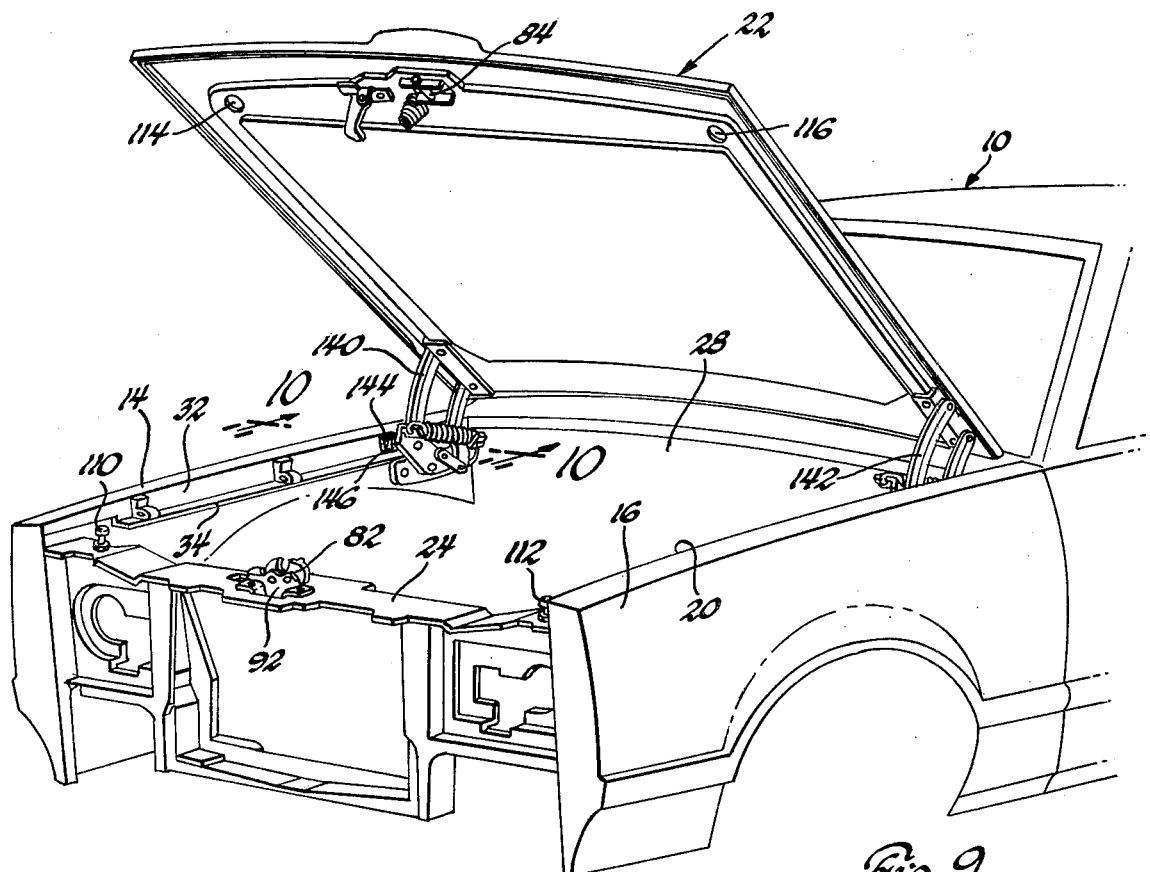
FIG. 9 is a view similar to FIG. 2 but showing a front end sheet metal assembly having a parallelogram type hood hinge.

Referring to FIG. 9, there is shown a motor vehicle body similar to FIG. 2 and having like elements identified by like numerals. The FIG. 9 vehicle differs from the FIG. 2 vehicle by the use of parallelogram or alligator type hinge assemblies 140 and 142. Hinges of this type have a substantial yieldability in the transverse direction and the vertical direction when the hood is closed.

Figure 10:
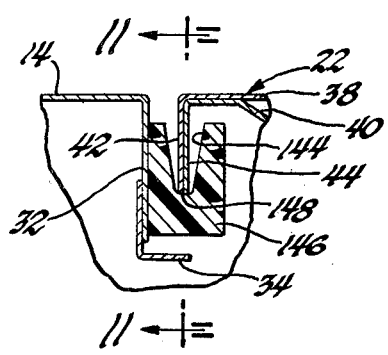
FIG. 10 is a sectional view taken in the direction of arrows 10—10 of FIG. 9.
Figure 11:
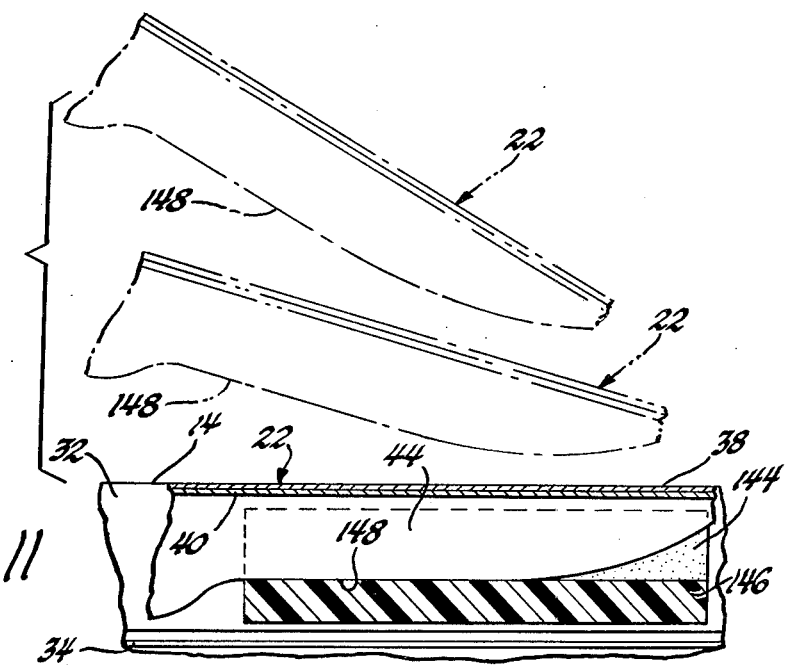
FIG. 11 is a view taken in the direction of arrows 11—11 of FIG. 10.

Referring to FIGS. 10 and 11, it is seen that the downturned flanges 42 and 44 of the hood 22 are received in a V-shaped groove 144 which is provided in a plastic block 146 suitably attached to the fenders 14 and 16. As best seen in FIG. 10, the transverse location of the V-shaped groove 144 will establish the transverse location of the hood 22 relative the downturned flange 32 of the fender 14 as well as the vertical location of the hood 22 relative the fenders 14 and 16. The spring mechanism associated with the hood hinges 140 and 142 provides a downward bias to the hood 22 which maintains the flanges 42 and 44 in engagement at the bottom of the V-shaped groove 144.

Referring to FIG. 9, it will be understood that the latch assembly 82, striker pin 84, adjusting screws 110 and 112 and the pads 114 and 116 are constructed similarly to the corresponding elements of FIG. 2 and that the identical method of preset and assembly is employed to determine the transverse and vertical and longitudinal locations thereof upon assembly of the hood to the motor vehicle.

With respect to presetting the transverse and vertical positions of the hood at the rearward end thereof, a grinding machine associated with the hood fixture grinds the hood flanges 42 and 44 to provide a cam surface 148 as seen in FIG. 11 at a precise vertical elevation relative the outer appearance surface of the hood outer panel 38.

The body fixture would have a milling machine for machining the V-shaped groove 144 into the plastic block 146 at a transverse location adapted to center the hood within the hood opening 20 and at a depth for coacting with the cam surface 148 of the hood 22 to vertically align the hood 22 with the outer appearance surfaces of the fenders 14 and 16.

Accordingly, upon closure of the hood 22, the hood panel flanges 42 and 44 coact with the V-shaped groove 144 in the plastic block 146 to center the hood relative the hood opening 20 and to vertically align the outer appearance surfaces of the hood with the adjacent appearance surfaces of the fenders 14 and 16.

The invention provides a method for the assembly of vehicle front end sheet metal which provides consistent precise alignment and centering of the front end component parts irrespective of variation in dimension and shape of the component parts and without resort to trial-and-error alternating steps of adjustment and inspection.

We claim:

1. In a motor vehicle body having a front end assembly including a pair of laterally spaced fenders, a header extending transversely between the fenders, a hood, a pair of hinges mounting the rearward end of the hood on the fenders to permit pivotal movement of the hood between open and closed positions, a striker at the forward end of the hood cooperable with a latch mounted on the header to latch the hood in the closed position, and adjustable screws mounted on the header to engage and support the forward undersurface of the hood, a method of precisely aligning and centering the outer appearance surfaces of the hood relative the adjacent appearance surfaces of the fenders and header comprising the steps of:

attaching the striker to the hood at a precise transverse and vertical position relative the outer appearance surfaces of the hood;

machining the undersurface of the hood engageable by the adjustable screws to a precise vertical height relative the outer appearance surface of the hood;

attaching the hood latch to the header at a precise vertical and transverse location relative the outer appearance surfaces of the fenders and header;

adjusting the adjustable screws to a precise vertical height relative the outer appearance surfaces of the fenders and header;

and attaching the hood hinges to the hood and the fenders at locations establishing a precise longitudinal location of the hood relative the fenders and header.

2. In a motor vehicle body having a front end assembly including a pair of laterally spaced fenders, a header extending transversely between the fenders, a hood, a pair of hinges mounting the rearward end of the hood, each hinge having a link for attachment to the hood and a link for attachment to the fender and a single pivot connecting the links to mount the hood for pivotal movement between open and closed positions, a striker at the forward end of the hood cooperable with a latch mounted on the header to latch the hood in the closed position, and adjustable screws mounted on the header to engage and support the forward undersurface of the hood, a method of precisely aligning and centering the appearance surfaces of the hood relative the adjacent appearance surfaces of the fenders and header comprising the steps of:

attaching the striker to the hood at a precise transverse and vertical location relative the appearance surfaces of the hood;

attaching the hood hinge link to the hood at a precise longitudinal and transverse location on the hood;

drilling a gage hole in the fender hinge link at a precise longitudinal and vertical location relative the appearance surfaces of the hood;

drilling a gage hole in the fender at a precise longitudinal location relative the forward edge of the hood and a vertical location relative the appearance surface of the fender so that alignment of the gage holes of the fender hinge link and the fender align and center the hood relative the appearance surfaces of the header and fenders;

machining the undersurface of the hood engageable by the adjustable screws to a precise vertical height relative the appearance surface of the hood;

attaching the hood latch to the header at a precise vertical and transverse location relative the appearance surfaces of the fenders and header so that the hood latch and striker coact to center the hood between the fenders and vertically align the adjacent appearance surfaces when the hood is closed;

adjusting the adjustable screws to a precise vertical location relative the appearance surfaces of the fenders and header so that the screws coact with the machined undersurface of the hood to vertically align the appearance surface of the hood with the fender and header when the hood is closed;

and attaching the fender hinge links to the fenders at a precise location determined by alignment of the fender hinge link gage hole with the fender gage hole.

3. In a motor vehicle body having a front end assembly including a pair of laterally spaced fenders, a header extending transversely between the fenders, a hood having flanges at the rearward end thereof, a pair of hinges mounting the rearward end of the hood on the fenders to permit pivotal movement of the hood between open and closed positions and being yieldable in the closed position to permit limited vertical and transverse movement of the hood relative the fenders, a striker at the forward end of the hood cooperable with a latch mounted on the header to latch the hood in the closed position, and a pair of adjustable screws mounted on the header to engage and support the forward undersurface of the hood, a method of precisely aligning and centering the appearance surface of the hood relative the adjacent appearance surfaces of the fenders and header comprising the steps of:

attaching the hood hinges to the hood and the fenders at locations establishing a precise longitudinal location of the hood relative the fenders and header;

grinding the hood flanges to form a cam surface having a precise vertical height relative the appearance surfaces of the hood;

machining cam surfaces on the vehicle body adjacent the rearward undersurface of the hood for coacting with the hood cam surfaces to vertically align the appearance surfaces of the hood with the adjacent surfaces of the fenders and to center the rearward end of the hood between the fenders;

attaching the striker to the hood at a precise transverse and vertical position relative the appearance surfaces of the hood;

machining the undersurface of the hood engageable by the adjustable screws to a precise vertical height relative the appearance surface of the hood;

attaching the hood latch to the header at a precise vertical and transverse location relative the appearance surfaces of the fenders and header so that the hood latch and striker coact to center the hood between the fender and vertically align the adjacent appearance surfaces when the hood is closed;

and adjusting the adjustable screws to a precise vertical height relative the appearance surfaces of the fenders and header so that the adjustable screws and machined undersurface of the hood coact to vertically align the appearance surfaces of the hood with the fender and header.

* * * * *